United States Patent
Yokoyama

(10) Patent No.: US 11,644,703 B2
(45) Date of Patent: May 9, 2023

(54) LIQUID CRYSTAL DISPLAY DEVICE COMPRISING FIRST AND SECOND BACKLIGHTS RESPECTIVELY OPPOSED TO FIRST AND SECOND LIQUID CRYSTAL DISPLAY PANELS THAT ARE BONDED SIDE BY SIDE TO A FRONT PANEL AND METHOD OF ASSEMBLING THE SAME

(71) Applicant: Shanghai Tianma Micro-Electronics Co., Ltd., Shanghai (CN)

(72) Inventor: Tomoharu Yokoyama, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/573,868

(22) Filed: Jan. 12, 2022

(65) Prior Publication Data
US 2022/0229328 A1   Jul. 21, 2022

(30) Foreign Application Priority Data
Jan. 15, 2021   (JP) .............................. JP2021-005363

(51) Int. Cl.
G02F 1/1333      (2006.01)
G02F 1/13357     (2006.01)
G02F 1/1335      (2006.01)

(52) U.S. Cl.
CPC ........ *G02F 1/13336* (2013.01); *G02F 1/1336* (2013.01); *G02F 1/133308* (2013.01); *G02F 1/133317* (2021.01); *G02F 1/133512* (2013.01); *G02F 1/133608* (2013.01)

(58) Field of Classification Search
CPC ....................... G02F 1/133342; G02F 1/13336
See application file for complete search history.

(56) References Cited

U.S. PATENT DOCUMENTS

| | | | |
|---|---|---|---|
| 2007/0081111 A1* | 4/2007 | Chang ................. | G02B 6/0055 349/62 |
| 2007/0126654 A1* | 6/2007 | Choi .................... | G09G 3/3648 345/1.1 |
| 2008/0174718 A1* | 7/2008 | Ma ........................ | G09G 3/342 349/62 |

(Continued)

FOREIGN PATENT DOCUMENTS

| JP | 2006-017894 A | | 1/2006 |
|---|---|---|---|
| JP | 2006017894 A | * | 1/2006 |
| JP | 2018-031898 A | | 3/2018 |

*Primary Examiner* — Paul C Lee
(74) *Attorney, Agent, or Firm* — Sughrue Mion, PLLC

(57) ABSTRACT

A liquid crystal display device includes a first liquid crystal display panel bonded to a rear face of a front panel, a second liquid crystal display panel bonded to the rear face of the front panel and located side by side with the first liquid crystal display panel, a light-blocking rib disposed in a gap between the first liquid crystal display panel and the second liquid crystal display panel, a first backlight disposed to be opposite to the first liquid crystal display panel, and a second backlight disposed to be opposite to the second liquid crystal display panel. The rib includes a first corner and a second corner. A corner of the first liquid crystal display panel and a corner of the first backlight are in contact against inside of the first corner. A corner of the second backlight is in contact against inside of the second corner.

14 Claims, 11 Drawing Sheets

(56) References Cited

U.S. PATENT DOCUMENTS

| 2010/0079696 | A1* | 4/2010 | Hwu | G06F 1/1616 |
| | | | | 349/57 |
| 2017/0090230 | A1* | 3/2017 | Yoon | G02F 1/133308 |
| 2019/0303086 | A1* | 10/2019 | Nagayama | H05K 5/0017 |

* cited by examiner

LIQUID CRYSTAL DISPLAY DEVICE COMPRISING FIRST AND SECOND BACKLIGHTS RESPECTIVELY OPPOSED TO FIRST AND SECOND LIQUID CRYSTAL DISPLAY PANELS THAT ARE BONDED SIDE BY SIDE TO A FRONT PANEL AND METHOD OF ASSEMBLING THE SAME

CROSS-REFERENCE TO RELATED APPLICATIONS

This non-provisional application claims priority under 35 U.S.C. § 119(a) on Patent Application No. 2021-005363 filed in Japan on Jan. 15, 2021, the entire content of which is hereby incorporated by reference.

BACKGROUND

This disclosure relates to a liquid crystal display device and a method of assembling the same.

In recent years, there is a trend to employ a multi-function display device for an on-vehicle display device. In such a multi-function on-vehicle display device, a meter cluster including a speedometer and a tachometer, various switches of a center console, a car navigation display, and the like are integrated. In order to integrate a plurality of kinds of information display, a horizontally long display device is demanded.

Three configurations to achieve a horizontally long display device are known. The first configuration includes one horizontally long liquid crystal display panel and one backlight. The second configuration includes a plurality of liquid crystal display panels disposed side by side and one backlight for illuminating the plurality of liquid crystal display panels. The third configuration includes a plurality of liquid crystal display panels and a plurality of backlights for illuminating the liquid crystal display panels individually.

The on-vehicle display devices are desired to have flexibility in shape, for example to fit variously designed dashboards, and a fail-safe function to provide necessary information even if a failure occurs to the display device. The configuration including a plurality of panels and a plurality of backlights allows independent control of the individual panels and backlights and accordingly, it is advantageous compared to the other configurations in the flexibility in shape and the fail-safe.

There are some known methods to dispose backlights behind a plurality of liquid crystal display panels. For example, the method disclosed in JP 2006-017894 A fits each backlight in a liquid crystal display panel. The method disclosed in JP 2018-031898 A disposes each backlight behind a liquid crystal display panel without fitting the backlight in the liquid crystal display panel.

SUMMARY

An aspect of this disclosure is a liquid crystal display device. The liquid crystal display device includes: a first liquid crystal display panel bonded to a rear face of a front panel; a second liquid crystal display panel bonded to the rear face of the front panel and located side by side with the first liquid crystal display panel; a light-blocking rib disposed in a gap between the first liquid crystal display panel and the second liquid crystal display panel; a first backlight disposed to be opposite to the first liquid crystal display panel; and a second backlight disposed to be opposite to the second liquid crystal display panel. The rib includes a first corner and a second corner. A corner of the first liquid crystal display panel and a corner of the first backlight are in contact against inside of the first corner. A corner of the second backlight is in contact against inside of the second corner.

Another aspect of this disclosure is a method of assembling a liquid crystal display device. The method includes: bonding a first liquid crystal display panel and a second liquid crystal display panel to different areas of a rear main face of a front panel; disposing a rib including a first corner and a second corner in a gap between the first liquid crystal display panel and the second liquid crystal display panel in such a position that inside of the first corner is in contact against a corner of the first liquid crystal display panel; disposing a first backlight in such a position that the first backlight is opposite to the first liquid crystal display panel and a corner of the first backlight is in contact against the first corner of the rib; and disposing a second backlight in such a position that the second backlight is opposite to the second liquid crystal display panel and a corner of the second backlight is in contact against the second corner of the rib.

It is to be understood that both the foregoing general description and the following detailed description are exemplary and explanatory and are not restrictive of this disclosure.

EMBODIMENTS

Hereinafter, embodiments of this disclosure will be described with reference to the accompanying drawings. It should be noted that the embodiments are merely examples to implement this disclosure and are not to limit the technical scope of this disclosure.

A liquid crystal display device in an embodiment of this specification includes a first liquid crystal display panel and a second liquid crystal display panel disposed side by side and bonded to the main face of a front panel. The liquid crystal display device further includes a first backlight and a second backlight disposed behind the first liquid crystal display panel and the second liquid crystal display panel, respectively. A light-blocking rib is disposed in the gap between the first liquid crystal display panel and the second liquid crystal display panel.

The rib is a guide member for positioning the backlights with respect to the liquid crystal display panels and includes a first corner and a second corner. A corner of the first liquid crystal display panel and a corner of the first backlight are in contact against the inside of the first corner of the rib. A corner of the second backlight is in contact against the inside of the second corner of the rib.

The light-blocking rib reduces the light from the backlights that passes through the gap between liquid crystal display panels to leak toward the viewer. The rib also enables the backlights and the liquid crystal display panels to be positioned appropriately. These functions improve the display quality of a display device including a plurality of display panels and backlights for the individual display panels.

Figure 1A:
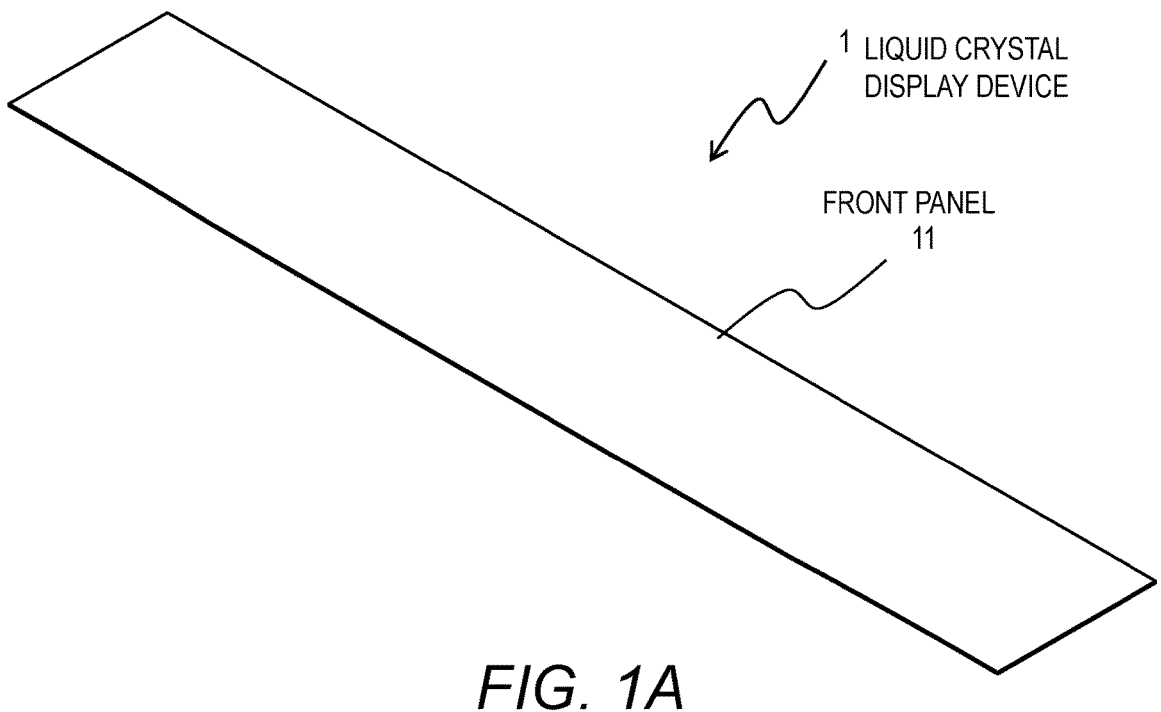
FIG. 1A illustrates a configuration of a liquid crystal display device when viewed from the front.
Figure 1B:
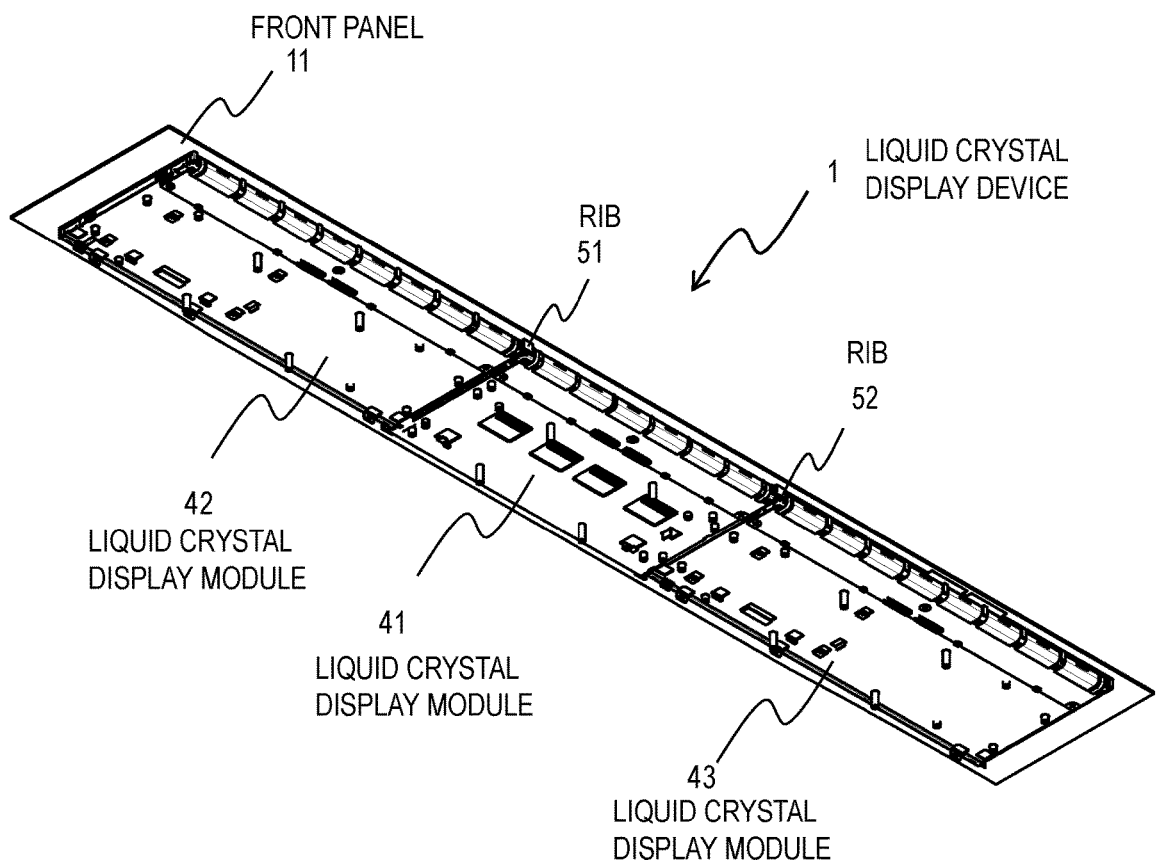
FIG. 1B illustrates a configuration of the liquid crystal display device when viewed from the back.

FIGS. 1A and 1B are perspective diagrams schematically illustrating the configuration of a liquid crystal display device in an embodiment of this specification. FIG. 1A illustrates the configuration when the liquid crystal display device is viewed from the front (the viewing side) and FIG. 1B illustrates the configuration when the liquid crystal display device is viewed from the rear (back). In this description, the side of the liquid crystal display device to display an image to be viewed by the user is defined as front side and the opposite side as rear side or backside.

A liquid crystal display device 1 includes a front panel 11, a plurality of liquid crystal display modules 41, 42, and 43 disposed side by side on the back of the front panel 11. Each of the liquid crystal display modules 41, 42, and 43 includes a backlight and a liquid crystal display panel disposed in front of the backlight. FIG. 1B shows the backlights of the liquid crystal display modules.

In the configuration example in FIGS. 1A and 1B, the main face of the front panel 11 is flat and has a rectangular shape in a planar view (when viewed in the direction normal to the main face). The main face of the front panel 11 can be curved, instead of being flat. The shape of the front panel 11 is not limited to a rectangle; the front panel 11 can have any shape suitable for installation, depending on the design. The front panel 11 is either colorless and transparent or colored and transparent; it can be made of glass or resin. The front panel 11 can have a touch panel function, for example. Further, an antireflection coating or film and/or a shatterproof film can be provided depending on the use environment or usage.

In this configuration example, the three liquid crystal display modules 41, 42, and 43 are disposed on the rear main face of the front panel 11 as illustrated in FIG. 1B. The front panel 11 covers the whole liquid crystal display modules 41, 42, and 43 when viewed from the front. The outlines of the liquid crystal display modules 41, 42, and 43 are located inner than the outline of the front panel 11. The number of liquid crystal display modules disposed on the front panel 11 and the layout of the liquid crystal display modules are not limited to this example; any layout suitable for installation can be employed depending on the appearance of the apparatus to include the display device and the design to achieve the appearance.

As illustrated in FIG. 1B, a rib 51 is disposed between the liquid crystal display modules 41 and 42 adjacent to each other and a rib 52 is disposed between the liquid crystal display modules 41 and 43 adjacent to each other. The ribs 51 and 52 are made of light-blocking material. As will be described later, the ribs 51 and 52 reduce the leak of light from the gap between liquid crystal display modules and further, work as guides for positioning the backlights. The ribs 51 and 52 will be described later in detail.

Figure 2:
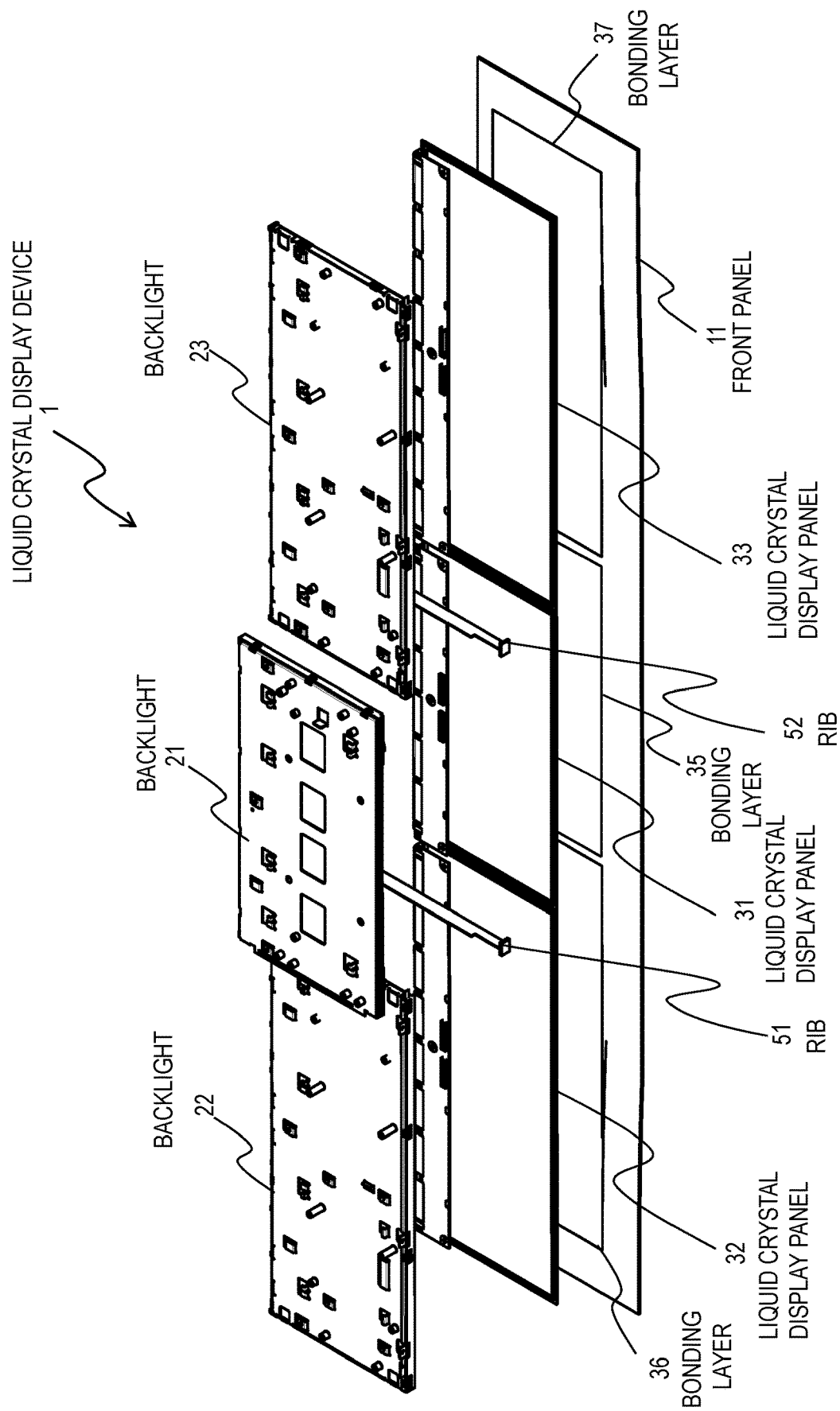
FIG. 2 is an exploded perspective diagram illustrating a configuration example of a liquid crystal display device in an embodiment.

FIG. 2 is an exploded perspective diagram illustrating a configuration example of the liquid crystal display device 1 in an embodiment. The liquid crystal display module 41 includes a liquid crystal display panel 31 and a backlight 21. The backlight 21 is disposed on the back of the liquid crystal display panel 31 to be opposite to the liquid crystal display panel 31.

The liquid crystal display module 42 includes a liquid crystal display panel 32 and a backlight 22. The backlight 22 is disposed on the back of the liquid crystal display panel 32 to be opposite to the liquid crystal display panel 32. The liquid crystal display module 43 includes a liquid crystal display panel 33 and a backlight 23. The backlight 23 is disposed on the back of the liquid crystal display panel 33 to be opposite to the liquid crystal display panel 33.

The liquid crystal display panels 31, 32, and 33 in the configuration example in FIG. 2 have flat main faces. Images are displayed on the front main faces. In another configuration example, the liquid crystal display panels 31, 32, and 33 can have curved main faces. Although the liquid crystal display panels 31, 32, and 33 have rectangular shapes, their shapes are not limited to a rectangle but can be other polygons or include a curved outline.

Each of the liquid crystal display panels 31, 32, and 33 includes resin or glass substrates opposite to each other and liquid crystal material therebetween. The liquid crystal display panels 31, 32, and 33 can have any configuration, for example, a vertical electric field type or a horizontal electric field type and a color type or a monochrome type.

The backlights 21, 22, and 23 in the configuration example in FIG. 2 have flat main faces. In another configuration example, the backlights 21, 22, and 23 can have curved main faces. Although the backlights 21, 22, and 23 have rectangular shapes, their shapes are not limited to a rectangle but can be other polygons or include a curved outline.

The backlights 21, 22, and 23 can have any configuration such as direct type or edge type and include light source components such as light-emitting diodes and further, components for controlling the direction of light from the light source components, such as a diffusion sheet or light guide plate, and a frame for housing those components.

The front main faces of the liquid crystal display panels 31, 32, and 33 are bonded to the rear main face of the front panel 11 by the bonding layers 35, 36, and 37. The bonding layers 35, 36, and 37 can be transparent resin layers and they are in direct contact with the front panel 11 and the liquid crystal display panels 31, 32, and 33. The bonding layers can be double-sided adhesive tapes or silicone or acrylic resin cured with UV light, heat, or moisture.

In the configuration example of FIG. 2, the outlines of the bonding layers 35, 36, and 37 are located inner than the outlines of the front main faces of the liquid crystal display panels 31, 32, and 33. In an example, the bonding layers 35, 36, and 37 cover the entire display regions of the liquid crystal display panels 31, 32, and 33. There is a gap between the bonding layers 35 and 36 adjacent to each other and there is another gap between the bonding layers 35 and 37 adjacent to each other.

The backlights 21, 22, and 23 are disposed on the back of the liquid crystal display panels 31, 32, and 33 to be opposite to the liquid crystal display panels 31, 32, and 33, respectively. The backlights 21, 22, and 23 can be fixed to the front panel 11 or a not-shown frame. For example, the backlights 21, 22, and 23 are screwed to L-shaped angles (not shown) bonded on the front panel 11.

There is a gap between the adjacent liquid crystal display panels 31 and 32 fixed on the front panel 11. In similar, there is a gap between the adjacent liquid crystal display panels 31 and 33 fixed on the front panel 11. There is also a gap between the adjacent backlights 21 and 22. In similar, there is a gap between the adjacent backlights 21 and 23.

The rib 51 is disposed in the gap between the liquid crystal display panels 31 and 32 and the gap between the backlights 21 and 22. The rib 52 is disposed in the gap between the liquid crystal display panels 31 and 33 and the gap between the backlights 21 and 23. The rib 51 can be bonded or screwed to the backlights 21 and 22 and the rib 52 can be bonded or screwed to the backlights 21 and 23. The ribs 51 and 52 can be fixed to only the backlight 21.

Figure 3:
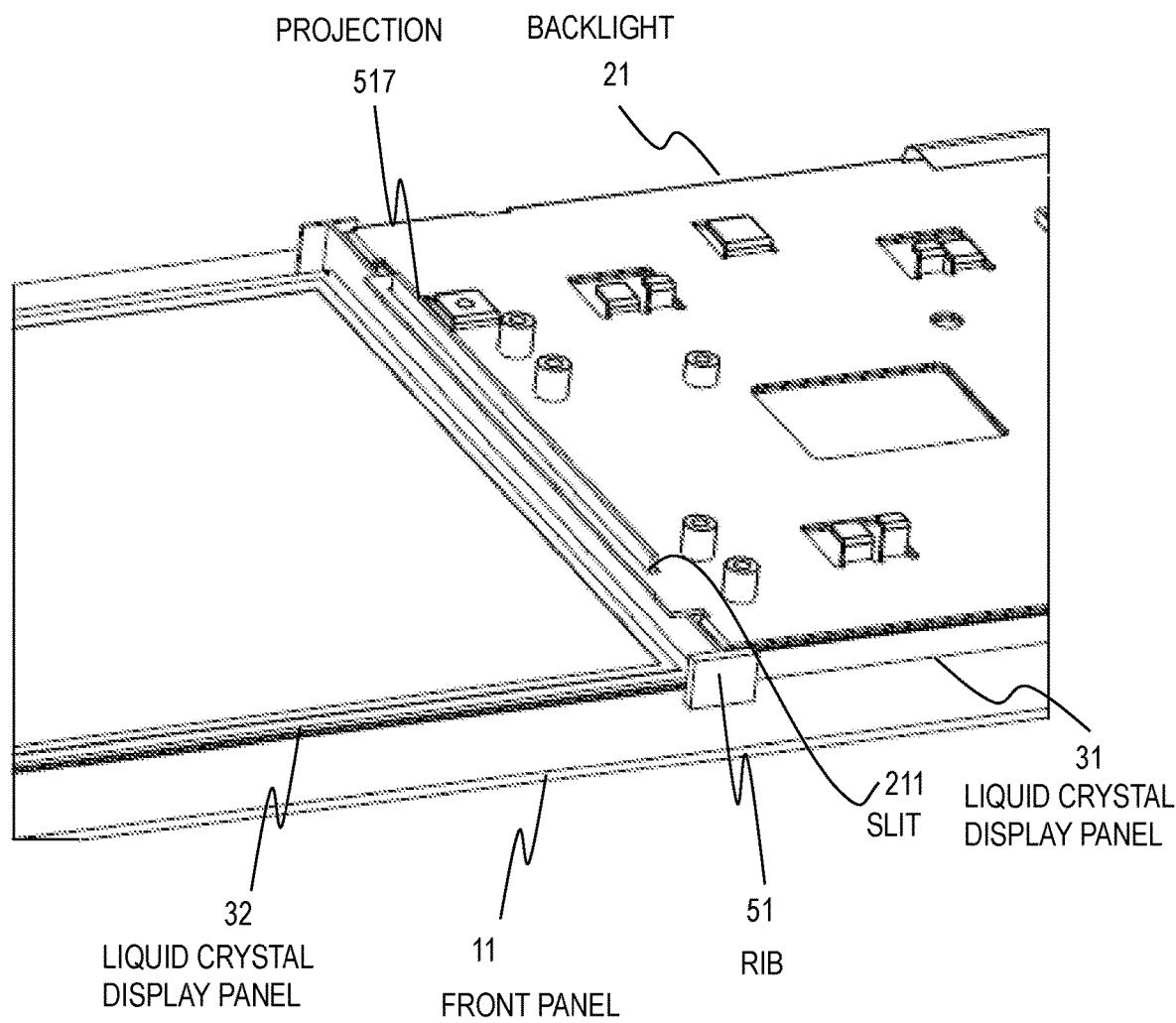
FIG. 3 is a perspective diagram schematically illustrating a configuration of some assembled components of a liquid crystal display device.

FIG. 3 is a perspective diagram schematically illustrating a configuration of some assembled components of the liquid crystal display device 1. Specifically, FIG. 3 includes liquid crystal display panels 31 and 32, a backlight 21, and a rib 51 disposed on the front panel 11. The liquid crystal display panel 31 is disposed in front of the backlight 21. A backlight 22 not shown in FIG. 3 is to be disposed on the back of the liquid crystal display panel 32.

In FIG. 3, a part of the rib 51 is located in the gap between the liquid crystal display panels 31 and 32 and the remaining part is located outside the gap between the liquid crystal display panels 31 and 32. In similar, another part of the rib 51 is located in the gap between the backlights 21 and 22 (the backlight 22 is not shown in FIG. 3) and the remaining part is located outside the gap between the backlights 21 and 22. As illustrated in FIG. 3, the rib 51 includes a projection 517. The projection 517 stands from the gap between the backlights 21 and 22 (the backlight 22 is not shown in FIG. 3) toward the back through a slit (opening) 211 provided in the backlight 21.

Figure 4:
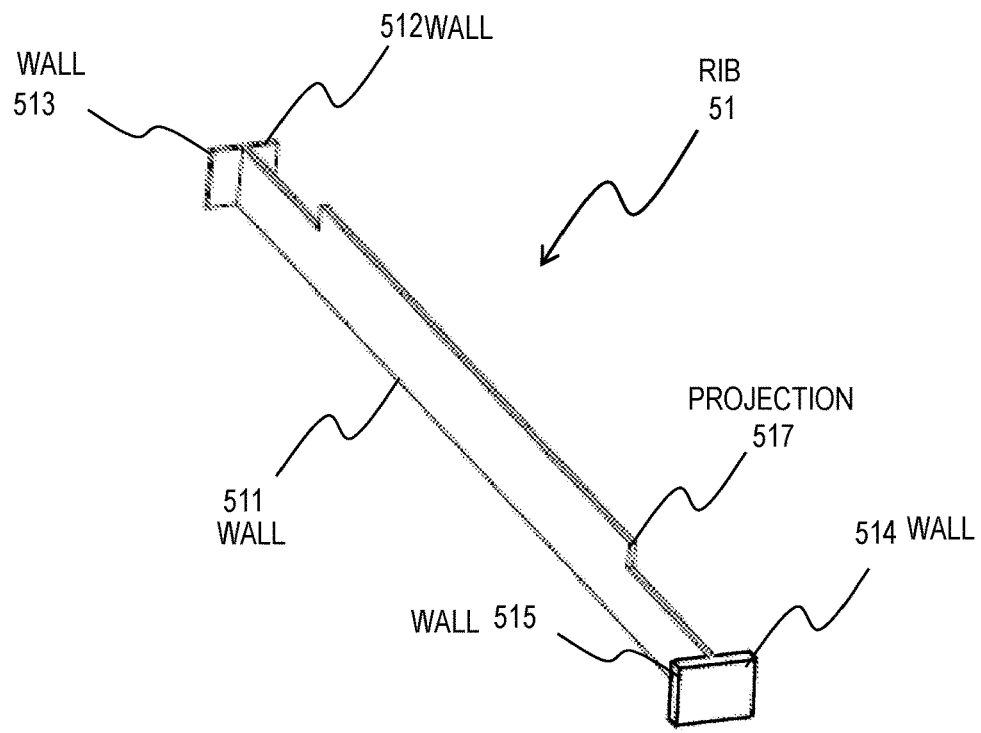
FIG. 4 is a perspective diagram illustrating a configuration example of a rib.

FIG. 4 is a perspective diagram illustrating a configuration example of the rib 51. The rib 52 can have the same configuration. The rib 51 has light-blocking property and can be black. The rib 51 is made of resin, for example. FIG. 4 illustrates an example of a self-standing shape that the rib 51 can stand on the rear face of the front panel 11 by itself. Specifically, when the rib 51 set in the liquid crystal display device 1 is viewed in the direction normal to the main face of the front panel 11 (in a planar view), the rib 51 has a shape like a letter of I. The rib 51 can have a shape such that the rib 51 cannot stand by itself.

The rib 51 in the configuration example of FIG. 4 has a plurality of walls 511 to 515 and a projection 517. In the state where the rib 51 is set, the walls 511 to 515 stand along the side faces of the liquid crystal display panels and the backlights from the rear main face of the front panel 11. In the configuration example of FIG. 4, the walls 511 to 515 stand in the direction normal to the rear main face of the front panel 11.

The first wall 511 is the largest wall in the rib 51; it is a flat wall extending in one direction. The first wall 511 includes the projection 517 projecting toward the back of the front panel 11. The second wall 512 is a flat wall extending in one direction from an end (first end) of the first wall 511. In the configuration example of FIG. 4, the angle between the first wall 511 and the second wall 512 is a right angle.

The third wall 513 is a flat wall extending oppositely to the second wall 512 from the aforementioned end of the first wall 511. In the configuration example of FIG. 4, the angle between the first wall 511 and the third wall 513 is a right angle. The fourth wall 514 is a flat wall extending in one direction from the other end (second end) of the first wall 511. In the configuration example of FIG. 4, the angle between the first wall 511 and the fourth wall 514 is a right angle. The direction in which the fourth wall 514 extends from the other end of the first wall 511 is the same as the direction in which the second wall 512 extends and the fourth wall 514 is parallel to the second wall 512.

The fifth wall 515 is a flat wall extending oppositely to the fourth wall 514 from the aforementioned other end of the first wall 511. In the configuration example of FIG. 4, the angle between the first wall 511 and the fifth wall 515 is a right angle. The direction in which the fifth wall 515 extends from the other end of the first wall 511 is the same as the direction in which the third wall 513 extends and the fifth wall 515 is parallel to the third wall 513.

Figure 5:
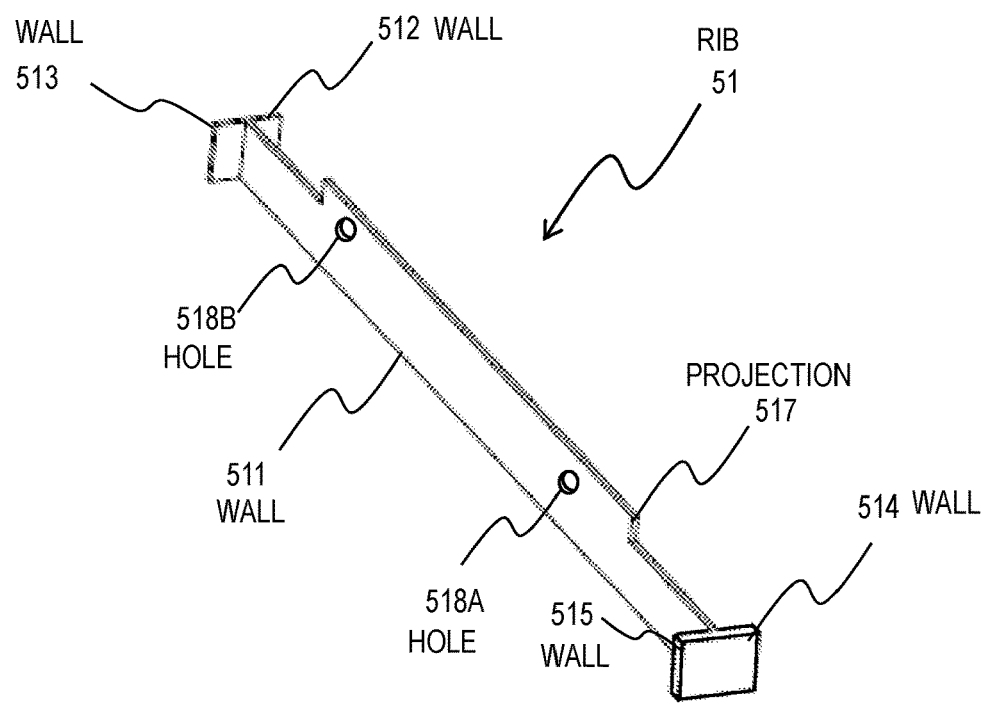
FIG. 5 is a perspective diagram illustrating another configuration example of a rib.

FIG. 5 is a perspective diagram illustrating another configuration example of the rib 51. Compared to the configuration example of FIG. 4, the first wall 511 of the configuration example in FIG. 5 have holes 518A and 518B for screwing. The rib 51 can be fixed to the backlight 21 by a screw passing through the hole 518A and fixed to the backlight 22 by a screw passing through the hole 518B.

The number of holes for screwing can be two or more depending on the design. For example, one or more holes are additionally provided between the holes 518A and 518B and the rib 51 is screwed to the backlight 21 through the holes 518A and 518B and screwed to the backlight 22 through the remaining holes.

The shapes of the walls 511 to 515 and the angles between adjacent walls are determined depending on the design of the appearances of the liquid crystal display panels and the backlights. For example, the walls 511 to 515 can be curved, instead of being flat. The angles between adjacent walls are not limited to the right angle. The ribs 51 and 52 can have a desirable shape including corners for positioning the backlights.

Figure 6:
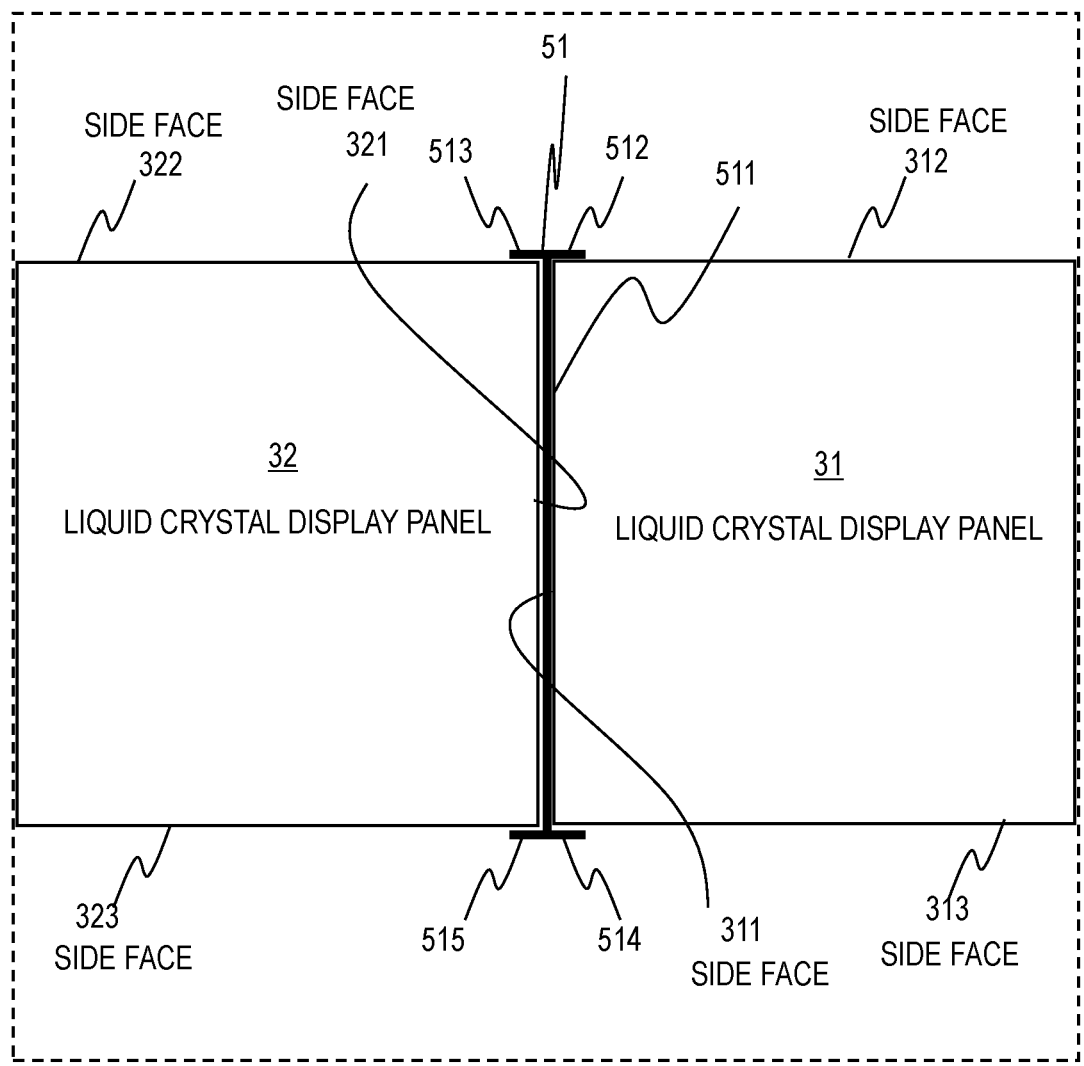
FIG. 6 schematically illustrates a state where a rib is disposed in a gap between liquid crystal display panels adjacent to each other.

FIG. 6 schematically illustrates a state where the rib 51 is disposed in the gap between the liquid crystal display panels 31 and 32 adjacent to each other. The following description about the relations of the rib 51 to the liquid crystal display panels 31 and 32 is applicable to the relations of the rib 51 to the backlights 21 and 22.

In the state where the rib 51 is set in the liquid crystal display device 1, the first wall 511 is located in the gap between the liquid crystal display panels 31 and 32. The first wall 511 is facing the first side face 311 of the liquid crystal display panel 31 and the first side face 321 of the liquid crystal display panel 32 and extends along the first side faces 311 and 321. The first wall 511 extends vertically in FIG. 6.

In the state where the rib 51 is set in the liquid crystal display device 1, the second wall 512 is facing the second side face 312 of the liquid crystal display panel 31 and extends along the second side face 312. The second wall 512 extends horizontally in FIG. 6. Further, the third wall 513 extends along the second side face 322 of the liquid crystal display panel 32.

In the state where the rib 51 is set in the liquid crystal display device 1, the fourth wall 514 extends along the third side face 313 of the liquid crystal display panel 31. The third side face 313 is the opposite side face of the second side face 312 of the liquid crystal display panel 31 the second wall 512 is facing. The fifth wall 515 extends along the third side face 323 of the liquid crystal display panel 32. The third side face 323 is the opposite side face of the second side face 322 of the liquid crystal display panel 32 the third wall 513 is facing.

Figure 7A:
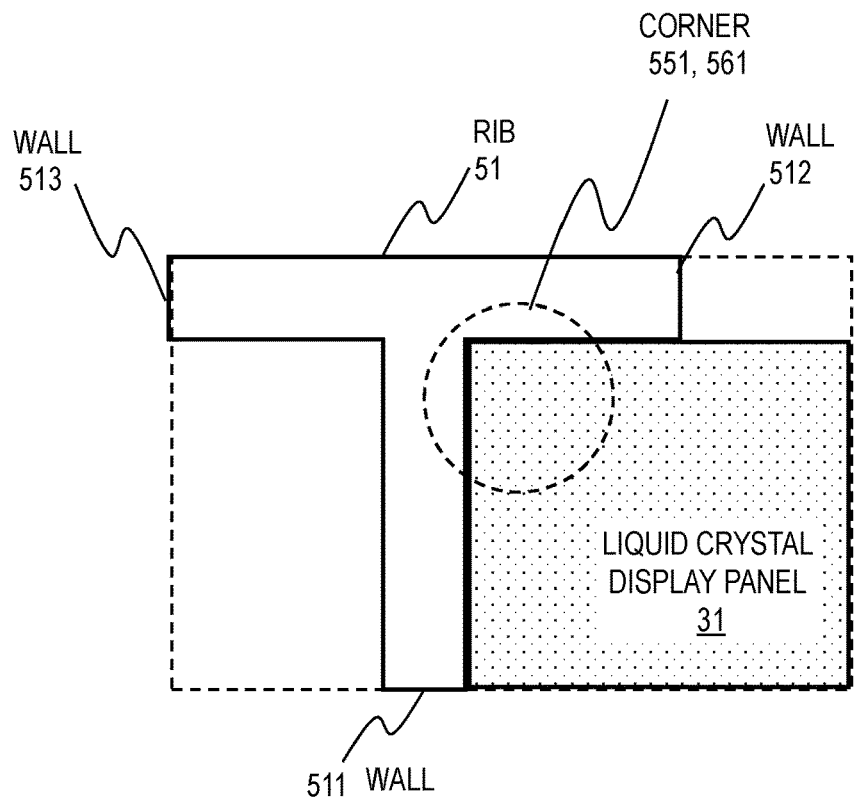
FIG. 7A is a plan diagram schematically illustrating a locational relation between a rib and a liquid crystal display panel.
Figure 7B:
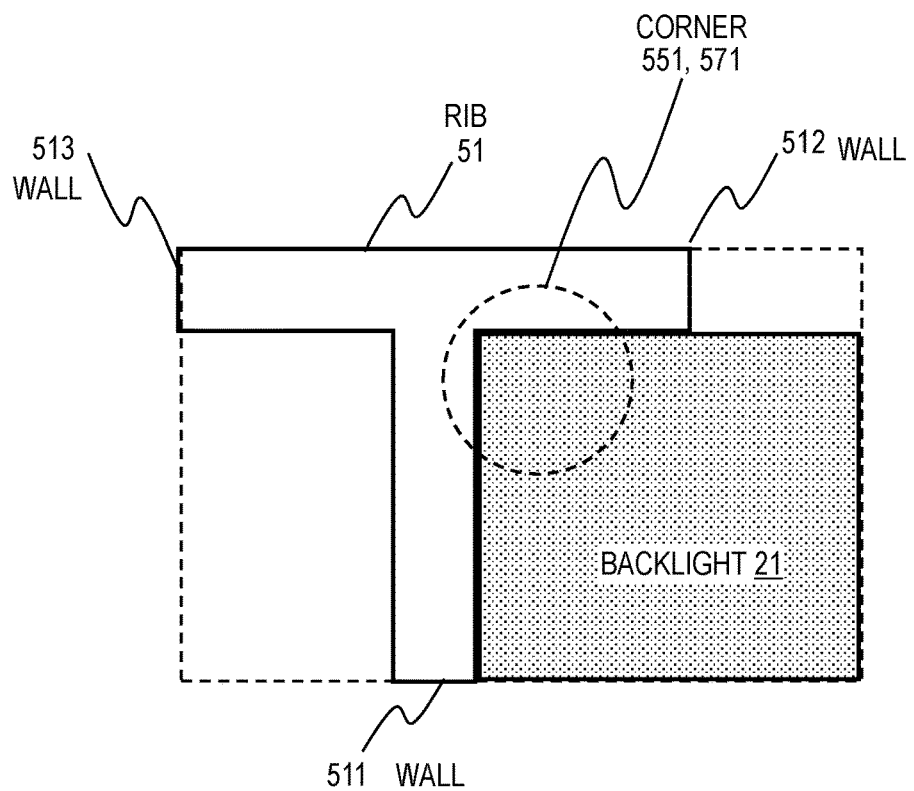
FIG. 7B is a plan diagram schematically illustrating a locational relation between a rib and a backlight.
Figure 7C:
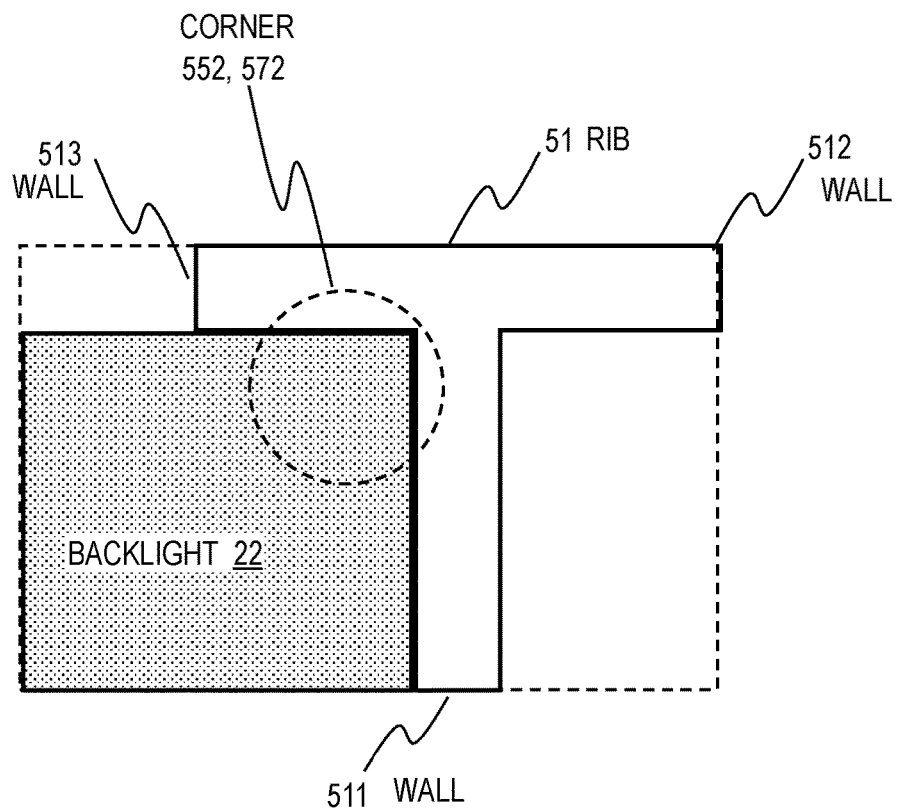
FIG. 7C is a plan diagram schematically illustrating a locational relation between a rib and another backlight.

FIGS. 7A, 7B, and 7C are plan diagrams for illustrating the locational relation between a rib and a liquid crystal display panel and the locational relations between the rib and a backlight. Specifically, the plan diagram of FIG. 7A schematically illustrates the locational relation between the rib 51 and the liquid crystal display panel 31; the plan diagram of FIG. 7B schematically illustrates the locational relation between the rib 51 and the backlight 21; and the plan diagram of FIG. 7C schematically illustrates the locational relation between the rib 51 and the backlight 22.

With reference to FIG. 7A, a corner 561 of the liquid crystal display panel 31 is in contact against the inside of a first corner 551 of the rib 51. The first corner 551 of the rib 51 is an inside corner defined by parts of the first wall 511 and the second wall 512. The corner 561 of the liquid crystal display panel 31 is an outside corner defined by parts of the side faces the first wall 511 and the second wall 512 are facing. The corner 561 of the liquid crystal display panel 31 is in contact against the first wall 511 and the second wall 512.

With reference to FIG. 7B, a corner 571 of the backlight 21 is in contact against the inside of the first corner 551 of the rib 51. The corner 571 of the backlight 21 is an outside corner defined by parts of the side faces the first wall 511 and the second wall 512 are facing. The corner 571 of the backlight 21 is in contact against the first wall 511 and the second wall 512.

With reference to FIG. 7C, a corner 572 of the backlight 22 is in contact with the inside of a second corner 552 of the rib 51. The second corner 552 of the rib 51 is an inside corner defined by parts of the first wall 511 and the third wall 513. The corner 572 of the backlight 22 is an outside corner defined by parts of the side faces the first wall 511 and the third wall 513 are facing. The corner 572 of the backlight 22 is in contact against the first wall 511 and the third wall 513.

As will be described later, the backlights 21 and 22 are positioned with respect to the rib 51. Specifically, the rib 51 is disposed in the gap between the two liquid crystal display panels 31 and 32 so that the corner 551 is in contact with the corner 561 of the liquid crystal display panel 31. Further, the backlight 21 is positioned and fixed so that the corner 571 of the backlight 21 is in contact against the inside of the corner 551 of the rib 51. In similar, the backlight 22 is positioned and fixed so that the corner 572 of the backlight 22 is in contact against the inside of the corner 552 of the rib 51.

The foregoing description about the rib 51 is applicable to the locational relation between the rib 52 and the liquid crystal display panel 31 and the locational relations between the rib 52 and the backlights 21 and 23. That is to say, corners of the liquid crystal display panel 31 and the backlight 21 are in contact against the inside of a corner of the rib 52. A corner of the backlight 23 is in contact against the inside of another corner of the rib 52.

As described above, the backlight 21 is positioned with respect to the opposite liquid crystal display panel 31 through the rib 51 and mounted. Further, the backlights 22 and 23 are positioned with respect to the backlight 21 through the ribs 51 and 52 and mounted. As a result, the dislocation of each backlight with respect to a liquid crystal display panel can be reduced to stabilize the mounting locations of the backlights in the product. Especially in the case where local dimming backlights are employed, the precision in the positioning of the lighting areas of the backlights to the pixels of the liquid crystal display panels is important; precise positioning of the backlights with respect to the liquid crystal display panels is more effective.

Since a backlight is positioned through a rib disposed between liquid crystal display panels, the backlight does not need to have a structure for positioning itself with respect to a liquid crystal display panel. To include a positioning structure for a panel in a backlight, the positioning structure has to be added to the rim of each backlight. In the case of using a rib, however, the backlight does not need to have the positioning structure; the gap between liquid crystal display panels can be made small. Further, the ribs 51 and 52 have light-blocking property, they reduce the light from the backlights to be seen by the viewer because of being reflected and diffused by the side faces of the liquid crystal display panels.

In the configuration example described with reference to FIGS. 7A, 7B, and 7C, the backlights 21 and 22 are positioned with respect to (placed against) the corners 551 and 552 at the same end of the first wall 511. This configuration achieves more appropriate positioning of the backlights 21 and 22.

The fourth wall 514 and the fifth wall 515 of the rib 51 are optional. In another configuration example, the backlight 21 and/or 22 can be positioned with respect to the corners of the other end of the first wall 511. Specifically, the backlight 22 can be mounted so that a corner of the backlight 22 is in contact against the inside of the corner (the second corner) between the first wall 511 and the fifth wall 515 of the rib 51. In this case, the third wall 513 and the fourth wall 514 of the rib 51 are optional.

Figure 8A:
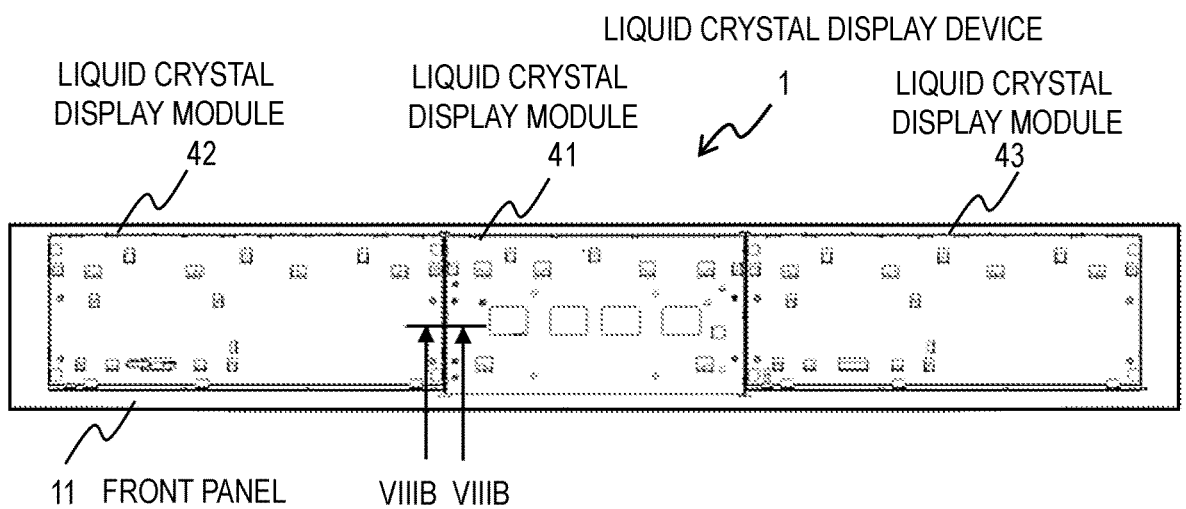
FIG. 8A illustrates a configuration of a liquid crystal display device when viewed from the back.
Figure 8B:
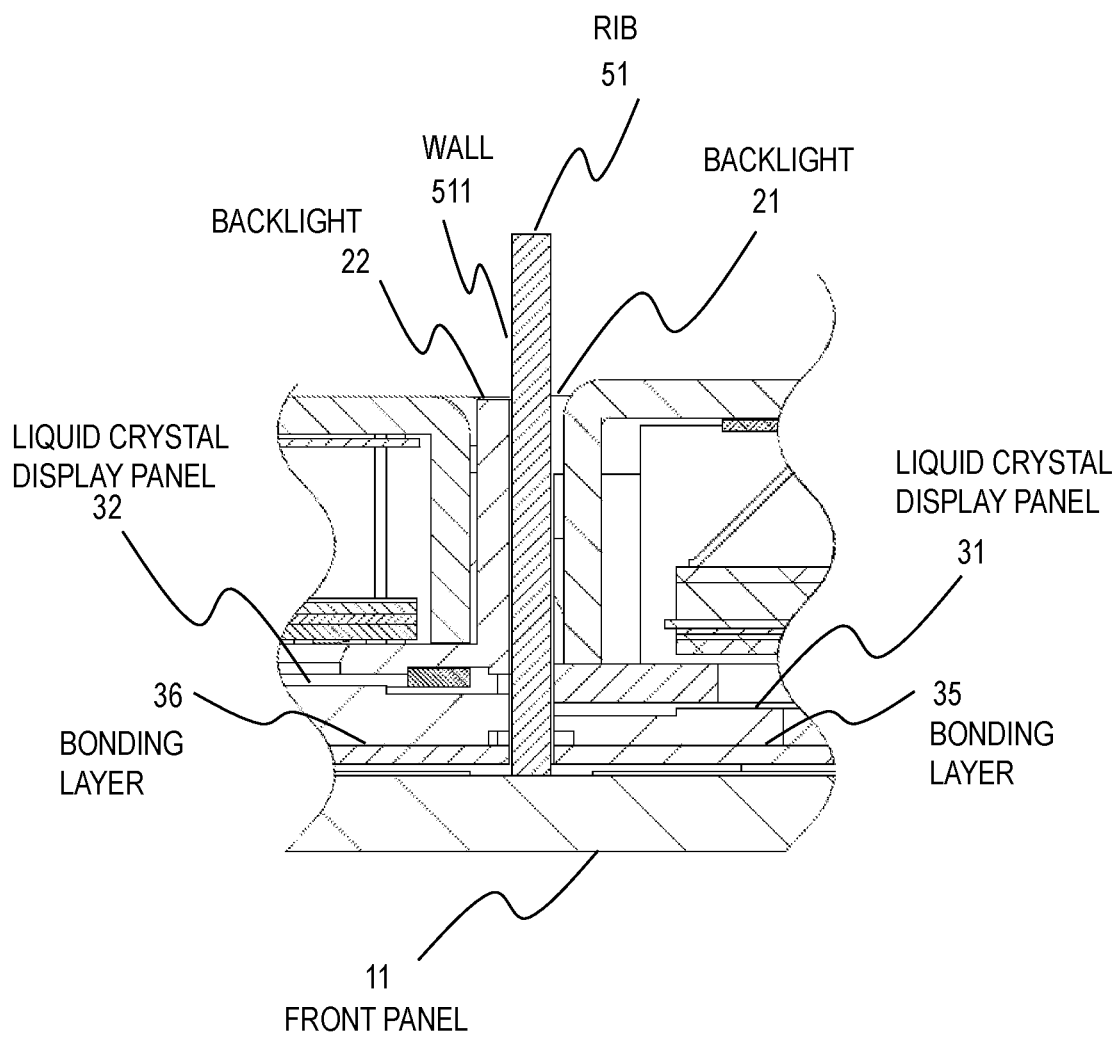
FIG. 8B schematically illustrates a cross-sectional structure along the section line VIIIB-VIIIB in FIG. 8A.

FIG. 8A illustrates a configuration of the liquid crystal display device 1 when viewed from the back. FIG. 8B schematically illustrates a cross-sectional structure along the section line VIIIB-VIIIB in FIG. 8A. Specifically, FIG. 8B illustrates the cross-sectional structure of the border between the liquid crystal display modules 41 and 42.

In the configuration example of FIG. 8B, the first wall 511 of the rib 51 is in contact with the rear face of the front panel 11 and stands from the rear face. The side faces of the liquid crystal display panels 31 and 32 are in contact with the first wall 511 of the rib 51. In similar, the side faces of the backlights 21 and 22 are in contact with the first wall 511 of the rib 51.

In the configuration example of FIG. 8B, the height of the first wall 511 is larger than both of the sum of the heights of the liquid crystal display panel 31 and the backlight 21 and the sum of the heights of the liquid crystal display panel 32 and the backlight 22. Because of this configuration, the rib 51 functions as a guide to place the backlights 21 and 22, enabling positioning of the backlights 21 and 22 to be easier.

In an example, the height of the walls defining corners with the first wall 511, specifically, the second wall 512 and the third wall 513, is larger than both of the sum of the heights of the liquid crystal display panel 31 and the backlight 21 and the sum of the heights of the liquid crystal display panel 32 and the backlight 22. Because of this configuration, the rib 51 functions as a guide to place the backlights 21 and 22, enabling positioning of the backlights 21 and 22 to be easier. One or two, or all of the first wall 511, the second wall 512, and the third wall 513 can satisfy the above-described conditions about the height.

Hereinafter, a method of assembling a liquid crystal display device 1 in an embodiment is described. Using the ribs 51 and 52 in positioning the backlights 21, 22, and 23 enables the dislocation of the mounted backlights to be small.

Figure 9:
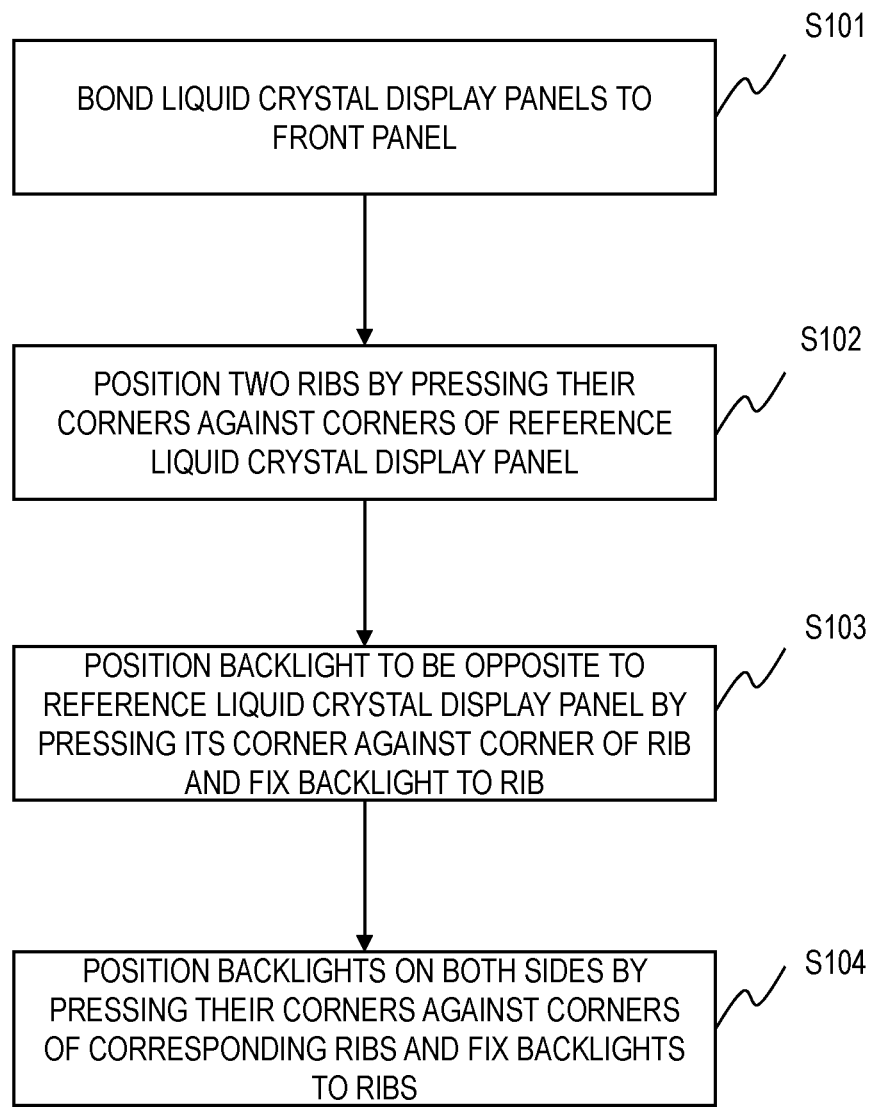
FIG. 9 is a flowchart of a method of assembling a liquid crystal display device in an embodiment.

FIG. 9 is a flowchart of a method of assembling a liquid crystal display device 1 in an embodiment. FIGS. 10A to 10D illustrate the transition of the configuration (state) of the liquid crystal display device being assembled in accordance with the flowchart of FIG. 9.

Figure 10A:
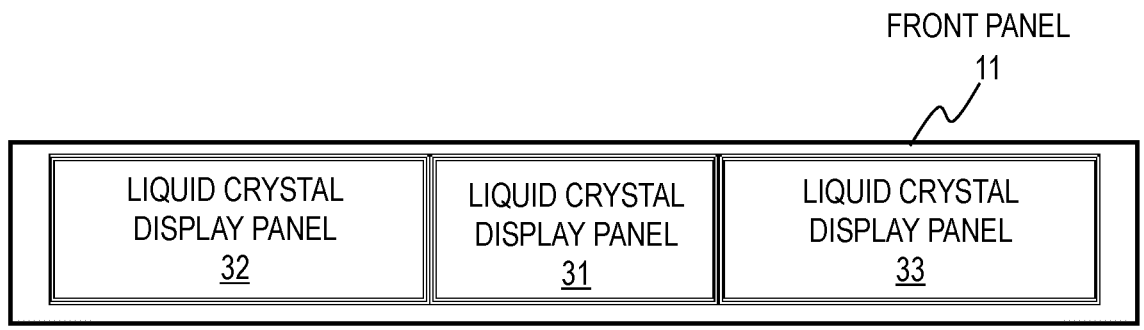
FIG. 10A illustrates a state in a step of assembling a liquid crystal display device.

With reference to FIG. 9, manufacturing a liquid crystal display device 1 first disposes liquid crystal display panels 31, 32, and 33 on bonding layers 35, 36, and 37 on the rear face of a front panel 11 and bonds the liquid crystal display panels 31, 32, and 33 to the rear face of the front panel 11 (S101). After disposing the liquid crystal display panels 31, 32, and 33, the manufacturing cures the bonding layers 35, 36, and 37 as necessary. FIG. 10A illustrates the liquid crystal display panels 31, 32, and 33 bonded on the rear face of the front panel 11.

Returning to FIG. 9, the manufacturing the liquid crystal display device 1 next inserts a rib 51 into a gap between the liquid crystal display panels 31 and 32 and further, positions the rib 51 by pressing the inside of a corner of the rib 51 against a corner of the liquid crystal display panel 31 of the reference liquid crystal display panel. Further, the manufacturing inserts a rib 52 into a gap between the liquid crystal display panels 31 and 33 and further, positions the rib 52 by pressing the inside of a corner of the rib 52 against a corner of the reference liquid crystal display panel 31 (S102). In this state, the ribs 51 and 52 do not have to be fixed to any components but can be fixed to the liquid crystal display panel 31 or the front panel 11 with an adhesive tape, for example.

Figure 10B:
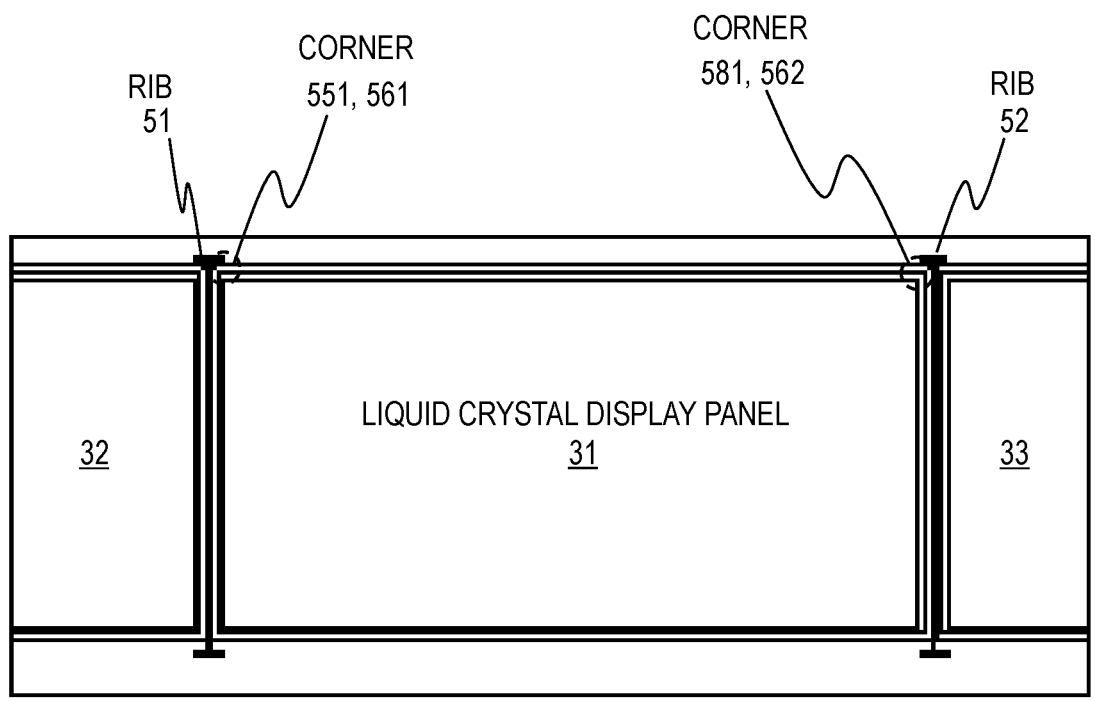
FIG. 10B illustrates a state in a step of assembling a liquid crystal display device.

FIG. 10B illustrates the ribs 51 and 52 inserted in the gap between liquid crystal display panels and positioned by being pressed against the reference liquid crystal display panel 31. As illustrated in FIG. 10B, the inside corner 551 of the rib 51 is in contact against the outside corner 561 of the liquid crystal display panel 31. The inside corner 581 of the rib 52 is in contact against the outside corner 562 of the liquid crystal display panel 31.

Positioning the ribs 51 and 52 on both sides of one reference liquid crystal display panel enables the subsequent positioning of the backlights to be performed more appropriately. In the example of FIG. 10B, the ribs 51 and 52 are positioned with respect to the corners 561 and 562 adjacent on the same side of the liquid crystal display panel 31. This configuration enables the subsequent positioning of the backlights to be performed more appropriately.

Figure 10C:
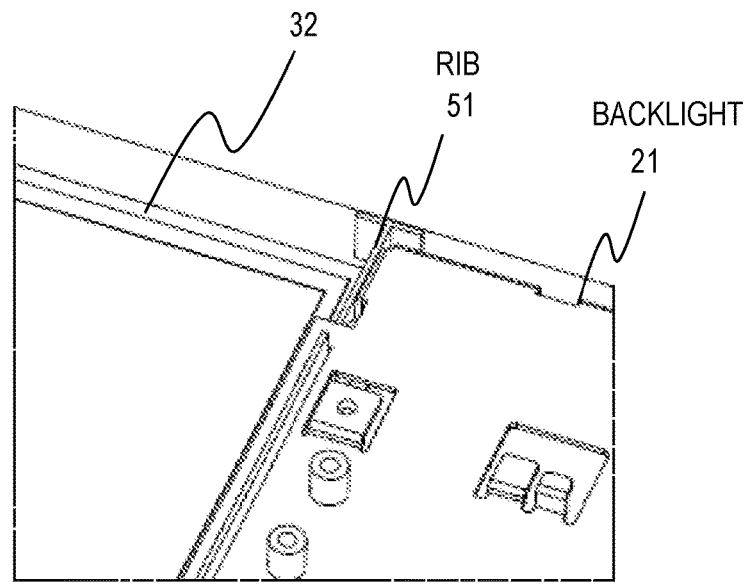
FIG. 10C illustrates a state in a step of assembling a liquid crystal display device.

Returning to FIG. 9, the manufacturing the liquid crystal display device 1 next positions a backlight 21 by pressing one or two outside corners of the backlight 21 against either one or both of the corner 551 of the rib 51 and the corner 581 of the rib 52 and fixes the backlight 21 to the ribs 51 and 52 (S103). If the ribs 51 and 52 are not fixed to any components, the ribs 51 and 52 can be held by the hands of the assembler or a jig. FIG. 10C illustrates the mounted backlight 21 in the correct position.

The backlight 21 does not have to be fixed to the rib 51 or 52. The backlight 21 can be fixed to the front panel 11 no matter whether it is fixed to the rib 51 or 52. The backlight 21 can be screwed to a component bonded on the front panel 11.

Figure 10D:
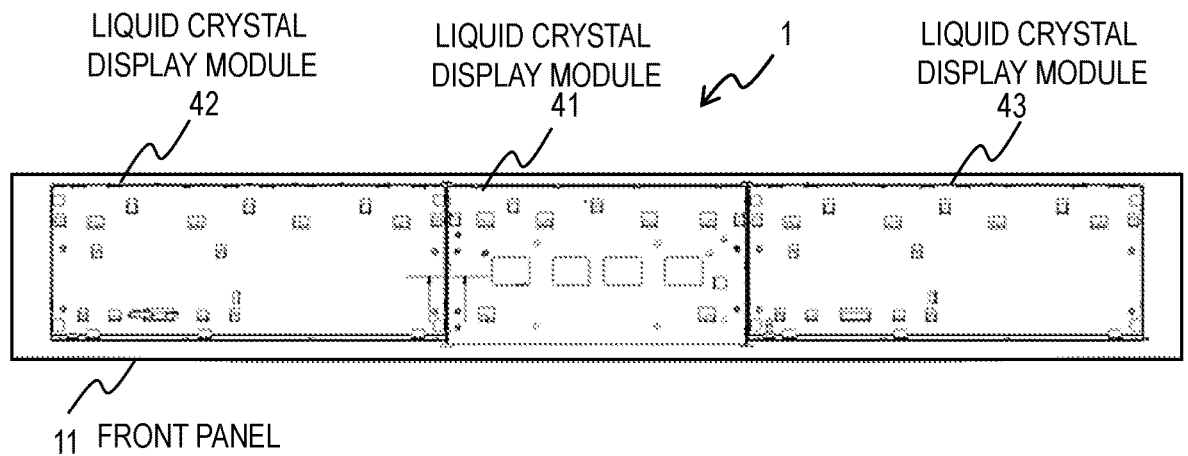
FIG. 10D illustrates a state in a step of assembling a liquid crystal display device.

Returning to FIG. 9, the manufacturing the liquid crystal display device 1 next positions a backlight 22 by pressing the outside corner 572 of the backlight 22 against the inside corner 552 of the rib 51 (see FIG. 7C) and fixes the backlight 22 to the rib 51. Further, the manufacturing positions a backlight 23 by pressing an outside corner of the backlight 23 against the inside corner of the rib 52 at the same end as and opposite to the inside corner 581 and fixes the backlight 23 to the rib 52 (S104). FIG. 10D illustrates the liquid crystal display device 1 after the backlights 21, 22, and 23 are mounted. Each of the liquid crystal display modules 41, 42, and 43 includes a liquid crystal display panel and a backlight opposite to each other.

The order of attaching the backlights 21, 22, and 23 can be determined desirably and is not limited to the above-described one. The backlights 22 and 23 do not have to be fixed to the ribs 51 and 52. The backlights 22 and 23 can be fixed to the front panel 11, as described about the backlight 21.

As described above, positioning the backlights 21, 22, and 23 with respect to the light-blocking ribs 51 or 52 in mounting them achieves narrower gaps between backlights, so that leakage of light from the backlights toward the viewer reduces. This configuration achieves a multi-function display having both fail-safe and satisfactory visibility.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A liquid crystal display device comprising:
a first liquid crystal display panel bonded to a rear face of a front panel;
a second liquid crystal display panel bonded to the rear face of the front panel and located side by side with the first liquid crystal display panel;
a light-blocking rib disposed in a gap between the first liquid crystal display panel and the second liquid crystal display panel;
a first backlight disposed to be opposite to the first liquid crystal display panel; and
a second backlight disposed to be opposite to the second liquid crystal display panel,
wherein the rib includes a first corner and a second corner,
wherein a corner of the first liquid crystal display panel and a corner of the first backlight are in contact against inside of the first corner, and
wherein a corner of the second backlight is in contact against inside of the second corner.

2. The liquid crystal display device according to claim 1, wherein the rib is self-standing in the gap between the first liquid crystal display panel and the second liquid crystal display panel.

3. The liquid crystal display device according to claim 1, wherein the rib is fixed to the first backlight.

4. The liquid crystal display device according to claim 1, wherein the rib includes:

a first wall extending along a first side face of the first liquid crystal display panel and a first side face of the second liquid crystal display panel in the gap;

a second wall extending from a first end of the first wall along a second side face of the first liquid crystal display panel; and a third wall extending from either the first end of the first wall or a second end of the first wall located opposite to the first end along a second side face of the second liquid crystal display panel, wherein the first corner includes a part of the first wall and a part of the second wall, and wherein the second corner includes a part of the first wall and a part of the third wall.

5. The liquid crystal display device according to claim 4, wherein the third wall extends oppositely to the second wall from the first end along the second side face of the second liquid crystal display panel.

6. The liquid crystal display device according to claim 4, wherein a height of the first wall is larger than a sum of a height of the first liquid crystal display panel and a height of the first backlight and larger than a sum of a height of the second liquid crystal display panel and a height of the second backlight.

7. The liquid crystal display device according to claim 4, wherein a height of the second wall and a height of the third wall are each larger than a sum of a height of the first liquid crystal display panel and a height of the first backlight and larger than a sum of a height of the second liquid crystal display panel and a height of the second backlight.

8. The liquid crystal display device according to claim 4, wherein the rib further includes:

a fourth wall extending oppositely to the second wall from the first end of the first wall; and a fifth wall extending oppositely to the third wall from the either end of the first wall.

9. The liquid crystal display device according to claim 4, wherein the first wall of the rib includes a projection projecting through an opening provided in the first backlight.

10. A method of assembling a liquid crystal display device, the method comprising:

bonding a first liquid crystal display panel and a second liquid crystal display panel to different areas of a rear main face of a front panel;

disposing a rib including a first corner and a second corner in a gap between the first liquid crystal display panel and the second liquid crystal display panel in such a position that inside of the first corner is in contact against a corner of the first liquid crystal display panel;

disposing a first backlight in such a position that the first backlight is opposite to the first liquid crystal display panel and a corner of the first backlight is in contact against the first corner of the rib; and disposing a second backlight in such a position that the second backlight is opposite to the second liquid crystal display panel and a corner of the second backlight is in contact against the second corner of the rib.

11. The method according to claim 10, wherein the disposing a rib including disposing the rib in such a manner that the rib stands by itself on the rear main face of the front panel.

12. The method according to claim 11, wherein the rib includes:

a first wall;

a second wall extending from a first end of the first wall to form the first corner with the first wall; and a third wall extending from the first end of the first wall or a second end of the first wall located opposite to the first end to form the second corner with the first wall, and wherein the disposing a rib including inserting the first wall into the gap and pressing inside of the first corner against the corner of the first liquid crystal display panel.

13. The method according to claim 12, wherein the third wall extends oppositely to the second wall from the first end of the first wall.

14. The method according to claim 10, further comprising:

fixing the rib to the first backlight before disposing the second backlight.

* * * * *